United States Patent
Abe et al.

(10) Patent No.: US 11,891,911 B2
(45) Date of Patent: Feb. 6, 2024

(54) CORROSION MONITORING DEVICE

(71) Applicant: FUJI ELECTRIC CO., LTD., Kawasaki (JP)

(72) Inventors: Yohsuke Abe, Tokyo (JP); Sakae Izumi, Kawasaki (JP); Yoshihiro Sakai, Sagamihara (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 17/873,576

(22) Filed: Jul. 26, 2022

(65) Prior Publication Data

US 2022/0356817 A1 Nov. 10, 2022

Related U.S. Application Data

(63) Continuation of application No. PCT/JP2021/026672, filed on Jul. 15, 2021.

(30) Foreign Application Priority Data

Aug. 13, 2020 (JP) ................... 2020-136776

(51) Int. Cl.
*F01D 25/32* (2006.01)
*B08B 3/08* (2006.01)
(Continued)

(52) U.S. Cl.
CPC ............... *F01D 25/32* (2013.01); *B08B 3/08* (2013.01); *F01D 21/003* (2013.01); *F01D 25/24* (2013.01); *G01N 17/00* (2013.01); *F05D 2220/31* (2013.01)

(58) Field of Classification Search
CPC ........ F01D 25/007; F01D 25/24; F01D 25/32; F01D 21/003; B08B 3/08; F05D 2220/31; G01N 17/00; Y02E 10/10
See application file for complete search history.

(56) References Cited

U.S. PATENT DOCUMENTS 4,283,200 A * 8/1981 Bodmer ............ G01N 17/00
422/53
4,386,498 A * 6/1983 Lee ................. F01D 17/08
60/660
(Continued)

FOREIGN PATENT DOCUMENTS

CN 104122197 A 10/2014
JP 09-170704 A 6/1997
(Continued)

OTHER PUBLICATIONS

International Search Report (Form PCT/ISA/210); dated Sep. 7, 2021 in corresponding PCT Application No. PCT/JP2021/026672 (3 pages) (2 pages English Translation).

(Continued)

*Primary Examiner* — Igor Kershteyn

(57) ABSTRACT

Provided is a corrosive environment monitoring device capable of monitoring the condition of a turbine for a long period of time without corrosion damage to a sensor caused by turbine steam. A corrosive environment monitoring device 10 includes: a steam extraction part 11 that extracts steam from inside of a casing 21 of a steam turbine 22 to outside thereof; a condensed water storage part 12 that stores therein condensed water produced by condensation of steam passing through the steam extraction part; and a corrosion factor sensor part 13 that detects properties of the condensed water. The condensed water storage part 12 includes a gap simulation part that simulates a gap inside the turbine and has a predetermined gap capable of storing the condensed water therein, and an annular channel formed on an outer periphery side of the gap simulation part. The corrosion factor sensor part 13 includes one or more sensors capable of measuring the properties of the condensed water, and a switching part configured to be capable of switching (Continued)

between contact and non-contact between the one or more sensors and the condensed water stored in the gap simulation part.

7 Claims, 7 Drawing Sheets

(51) Int. Cl.
   *F01D 21/00* (2006.01)
   *F01D 25/24* (2006.01)
   *G01N 17/00* (2006.01)

(56) References Cited

U.S. PATENT DOCUMENTS

| | | | | |
|---|---|---|---|---|
| 4,488,939 | A | * 12/1984 | Fu | G01N 17/02 205/777 |
| 6,628,111 | B2 | * 9/2003 | Shapiro | G01N 17/006 324/71.2 |
| 9,033,649 | B2 | 5/2015 | Kato et al. | |
| 11,098,724 | B2 | * 8/2021 | Sundararajan | G05B 13/048 |
| 2007/0120572 | A1 | * 5/2007 | Chen | G01N 17/04 324/700 |
| 2011/0027063 | A1 | * 2/2011 | Hefner | G01N 17/02 415/118 |
| 2012/0128469 | A1 | 5/2012 | Kato et al. | |

FOREIGN PATENT DOCUMENTS

| | | |
|---|---|---|
| JP | 2008008744 A | 1/2008 |
| JP | 2012168116 A | 9/2012 |
| JP | 2012168117 A | 9/2012 |
| JP | 2012168118 A | 9/2012 |
| JP | 5267672 B2 | 5/2013 |

OTHER PUBLICATIONS

Written Opinion (Form PCT/ISA/237); dated Sep. 7, 2021 in corresponding PCT Application No. PCT/JP2021/026672 (3 pages).
Icelandic Office Action issued by Icelandic Intellectual Property Office in corresponding Icelandic Application No. IS050373 (EU050373) dated Oct. 2, 2023.

* cited by examiner

CORROSION MONITORING DEVICE

CROSS-REFERENCE TO RELATED APPLICATIONS

This is a continuation application of PCT Application No. PCT/JP2021/026672, filed Jul. 15, 2021, which claims priority from Japanese Patent Application No. 2020-136776, filed on Aug. 13, 2020, both of which are incorporated herein by reference in their entirety.

TECHNICAL FIELD

The present invention relates to a corrosion monitoring device. In particular, the present invention relates to a turbine corrosion monitoring device capable of monitoring the corrosion condition of turbine materials for a long period of time on the basis of results of measurement on steam-derived samples containing corrosive gas.

BACKGROUND ART

Power generation facilities using steam turbines, such as geothermal power generation facilities and thermal power generation facilities, are widely used. Among these, especially in geothermal turbines, corrosive gases, such as hydrogen sulfide or carbon dioxide, may come into contact with the turbine, and condensed water is produced from steam containing the corrosive gas after the steam works. Thus, corrosion damage to turbine materials occurs due to metal being attacked by the condensed water which is in contact with the condensed water. As a result, there is concern of a risk of an accident due to cracking, such as stress corrosion cracking. Corrosion damage to metal materials is largely dependent on the environment with which the materials are in contact. Thus, in order to protect turbine materials from corrosion damage, it may be effective to grasp the quality of the water with which the turbine materials are in contact and control the quality of the water on the basis of the grasped information.

Conventional water quality control for turbines is performed by sampling condensed water produced by condensation of turbine steam and using the water quality of the obtained samples as representative water quality. However, the water quality of the condensed water produced after the steam works inside the turbine is different from the representative water quality. Thus, such a method is insufficient for maintenance management against turbine material corrosion inside the turbine.

Since turbines are bodies rotating at high speed, it is extremely difficult to directly measure and understand the condition of turbine members during operation. On the other hand, since operation of turbines is typically stopped about once every several years, a technique for detecting damage during operation is required. As a solution to this problem, the applicant of the present invention has proposed a technique for monitoring the corrosion condition of turbine materials by manufacturing a structure that simulates the structure of a turbine, extracting steam from the actual turbine and introducing the extracted steam into the structure installed inside a casing of the turbine, and continuously measuring the potential, chloride concentration, pH, and the like of the materials at that time (e.g., refer to Patent Document 1).

REFERENCE DOCUMENT LIST

Patent Document

Patent Document 1: JP 2012-168118 A

SUMMARY OF THE INVENTION

Problem to be Solved by the Invention

However, when the technique disclosed in Patent Document 1 is applied to monitoring of steam containing corrosive components, for example, in a geothermal turbine, corrosion damage to various sensors is caused by components of steam, which makes accurate measurement difficult. Also, devices installed inside the casing of the turbine receive electrical noise from the turbine, which disadvantageously makes it difficult to obtain accurate measurement results.

The present invention has been made in view of the problems described above and provides a corrosion monitoring device that is less likely to be damaged by steam containing corrosive components and is capable of accurately measuring the corrosion condition of turbine materials for a sufficient period of time.

Means for Solving the Problem

The inventors of the present invention have conducted intensive research, and thus conceived a structure that enables intermittent measurement using a sensor to solve the problems, and completed the present invention. That is, according to an embodiment, the present invention relates to a corrosive environment monitoring device including:
  a steam extraction part that extracts steam from the inside of a casing of a steam turbine to the outside thereof;
  a condensed water storage part that stores therein condensed water produced by condensation of steam passing through the steam extraction part; and
  a corrosion factor sensor part that detects properties of the condensed water, wherein
  the condensed water storage part includes a gap simulation part that simulates a gap inside the turbine and has a predetermined gap capable of storing the condensed water therein, and an annular channel formed on an outer periphery side of the gap simulation part, and
  the corrosion factor sensor part includes one or more sensors capable of measuring the properties of the condensed water, and a switching part configured to be capable of switching between contact and non-contact between the one or more sensors and the condensed water stored in the gap simulation part.

Preferably, in the corrosive environment monitoring device,
  the switching part includes a sensor head part that houses the one or more sensors therein, and a sensor head receiving part provided between the sensor head part and the gap simulation part,
  the sensor head receiving part has a through hole provided corresponding to the one or more sensors,
  the sensor head part is turned relative to the sensor head receiving part to perform switching between a state in which the one or more sensors and the condensed water stored in the gap simulation part are contactable through the through hole and a state in which contact between the one or more sensors and the condensed water stored in the gap simulation part is blocked by the sensor head receiving part interposed between the one or more sensors and the gap simulation part.

Preferably, in the corrosive environment monitoring device, the one or more sensors are removably supported by the sensor head part.

Preferably, the corrosive environment monitoring device further includes a cleaner capable of cleaning the one or more sensors.

Preferably, in the corrosive environment monitoring device, the one or more sensors include any one or more of an electrolytic corrosion potential sensor, a pH sensor, and a chloride ion sensor.

Preferably, in the corrosive environment monitoring device, the steam is geothermal steam.

According to another embodiment, the present invention relates to a power generation facility including: a steam turbine device including a turbine inside a casing; and the corrosive environment monitoring device according to any one of the above aspects.

Effects of the Invention

The corrosion monitoring device of the present invention has the structure that simulates the gap part in which corrosion of the turbine is likely to occur and is configured to be capable of switching between a state in which the sensors used in monitoring are in contact with condensed water produced from turbine steam and a state in which the sensors are not in contact with the condensed water. Thus, the sensors are less likely to be damaged by corrosive components contained in the steam, and monitoring results with high reliability can be provided for a long period of time. Furthermore, the corrosion monitoring device installed outside the turbine casing is less susceptible to electrical noise, which enables accurate monitoring results to be obtained.

MODE FOR CARRYING OUT THE INVENTION

Hereinbelow, an embodiment of the present invention will be described. Note that the embodiment described below does not limit the scope of the present invention.

According to an embodiment, the present invention relates to a corrosion monitoring device. A corrosion monitoring device according to the present embodiment measures and monitors the properties of steam in a power generation facility provided with a steam turbine device. The steam to be measured is steam which has been supplied into the steam turbine device from outside, and which is before being used to rotate the turbine. The steam turbine device may be either a gas turbine or a geothermal turbine.

Figure 1:
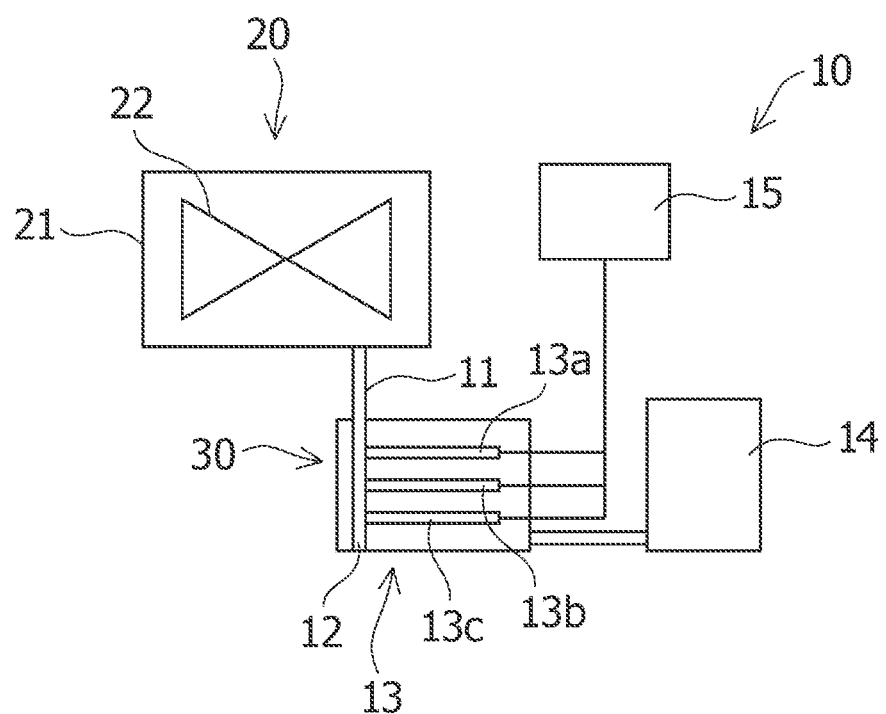
FIG. 1 is an explanatory diagram conceptually illustrating a corrosion monitoring device and a steam turbine device according to an embodiment of the present invention.

FIG. 1 is a diagram schematically illustrating the configurations of a corrosion monitoring device according to an embodiment of the present invention and a power generation facility provided with the corrosion monitoring device. Although a geothermal power generation facility will be described as an example in the present embodiment, the present invention is applicable not only to the geothermal power generation facility, but also to various power generation facilities provided with a turbine. In FIG. 1, the geothermal power generation facility includes a geothermal steam turbine device 20 and a corrosion monitoring device 10. The geothermal steam turbine device 20 includes a turbine 22 provided inside a casing 21. On the other hand, the corrosion monitoring device 10 includes a steam extraction part 11, a condensed water storage part 12, a corrosion factor sensor part 13, a steam cooler 14, and a control unit 15. The condensed water storage part 12 and the corrosion factor sensor part 13 are integrated to constitute a sensor block 30. The corrosion factor sensor part 13 includes a pH sensor 13a, a chloride ion sensor 13c, an electrolytic corrosion potential sensor 13b (also called a blade material potential sensor), and a reference electrode (not illustrated).

The configuration of the geothermal power generation facility including the geothermal steam turbine device 20 will be described. Geothermal steam is fed from a production well of the geothermal power generation facility and separated by a high-pressure separator into steam and hot water. The separated steam is cleaned and fed to the geothermal steam turbine device 20 through a scrubber that removes mist, and the turbine 22 is rotated using the steam. A turbine blade includes moving blades attached to a turbine rotor and stationary blades attached to the casing 21, the moving blades and the stationary blades being alternately arranged. Materials of the turbine rotor, the moving blades, and the stationary blades are not limited to any particular materials. The turbine rotor may be formed of, for example, 1% CrMoV steel. The moving blades and the stationary blades (blades materials) may be formed of, for example, 13% Cr steel.

Figure 2:
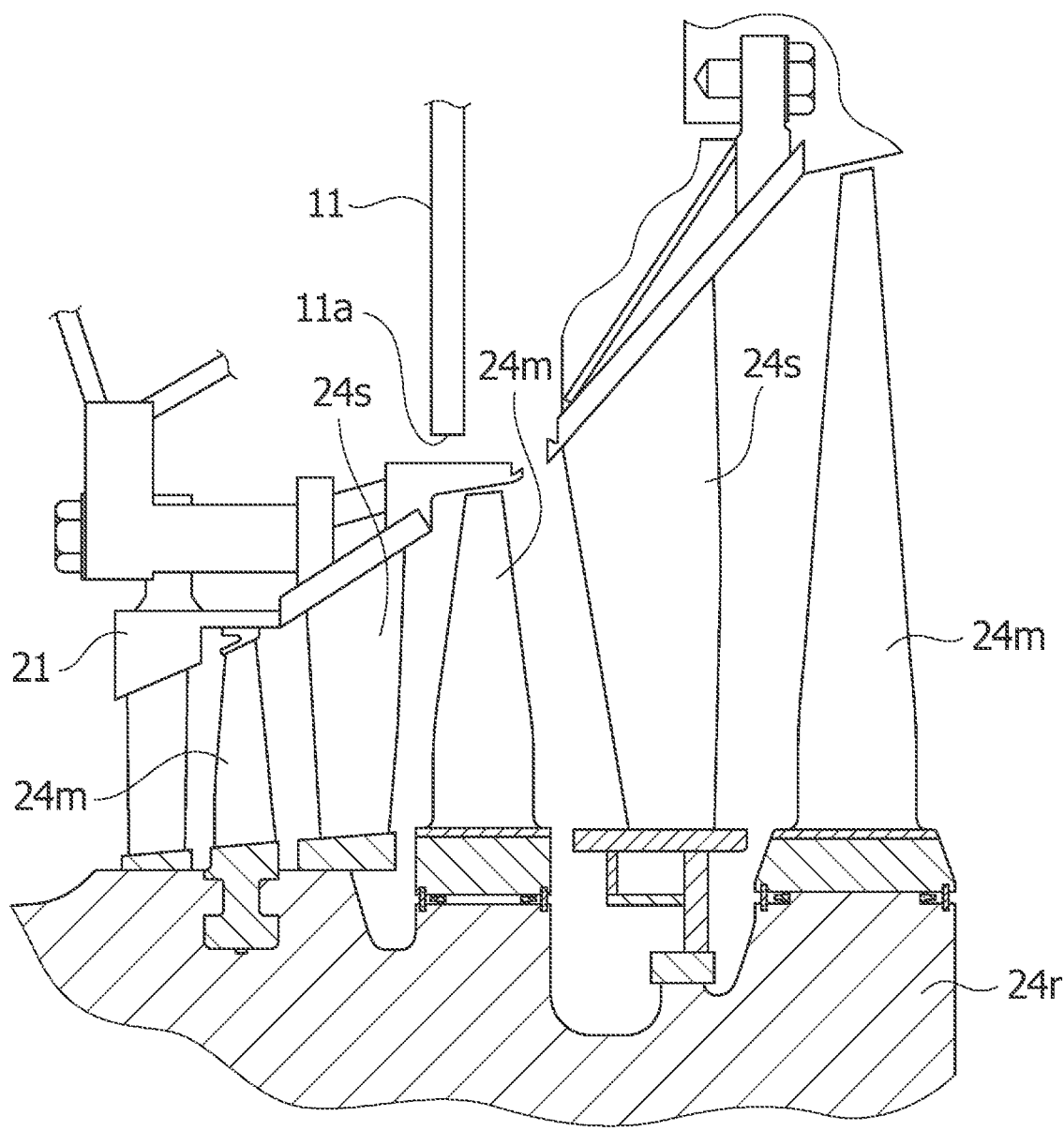
FIG. 2 is a partial sectional view of a low-pressure blade row of a turbine according to the embodiment of the present invention illustrating, as an example, the positional relationship between a steam extraction part (steam extraction port) of the corrosion monitoring device and the steam turbine blade row.

In the corrosion monitoring device 10 according to the present embodiment, the condensed water storage part 12 and the corrosion factor sensor part 13 are provided outside the casing 21. The steam extraction part 11 extends from the inside of the casing 21 to the outside thereof and extracts steam present near a low-pressure blade row of the turbine 22 to the outside of the casing 21. FIG. 2 is a partial sectional view of the low-pressure blade row of the turbine 22. The low-pressure blade row includes moving blades 24*m* attached to a turbine rotor 24*r* and stationary blades 24*s* attached to the casing 21, the moving blades 24*m* and the stationary blades 24*s* being alternately arranged. The length of the moving blades 24*m* and the stationary blades 24*s* in the radial direction sequentially increases from the center of the turbine rotor 24*r* toward the outside. In the present embodiment, the steam extraction pipe 11, which is an example of the steam extraction part, is installed in such a manner that a steam extraction port 11*a* is located inside the casing 21 at a position closely facing the tip of the moving blade 24*m* in a central part of the low-pressure blade row in the axial direction. This makes it possible to extract steam reflecting the corrosion condition of the turbine blades in the stage before the turbine being rotated and make the steam object of measurement. Furthermore, the steam extraction pipe 11 extends from the inside of the casing 21 to the outside thereof and is coupled to the condensed water storage part 12 of the corrosion monitoring device present outside the casing 21.

The steam extraction pipe 11 is cooled by the steam cooler 14 in a stage preceding a stage in which the steam extraction pipe 11 is connected to the condensed water storage part 12 of the corrosion monitoring device outside the casing 21. The steam cooler 14 may be any device that is installed outside the casing 21 and capable of condensing high-temperature steam inside the steam extraction pipe 11 and cooling the steam to obtain liquid condensed water. As an example of the steam cooler 14, a cooling water circulation device can be used. The cooling water circulation device may include a chiller serving as a cooling water source, a cooling water feed path, and a cooling water discharge path. A cooling water circulation device disclosed in Patent Document 1 invented by the applicant of the present invention can be used. However, the cooling water circulation device is not limited to any particular device. The steam cooler 14 may cool not only the steam extraction pipe 11, but also the entirety of the condensed water storage part 12 and the corrosion factor sensor part 13.

The condensed water storage part 12 and the corrosion factor sensor part 13 are disposed outside the casing 21. The condensed water storage part 12 and the corrosion factor sensor part 13 are integrated to constitute the sensor block 30. The condensed water storage part 12 includes an annular channel and a gap simulation part, which will be described in detail later. The corrosion factor sensor part 13 includes a plurality of sensors that detects the properties of condensed water stored in the gap simulation part. The corrosion factor sensor part 13 further includes a switching part that performs switching between a state in which each sensor is contactable with the condensed water and a state in which contact between each sensor and the condensed water is blocked.

Figure 3:
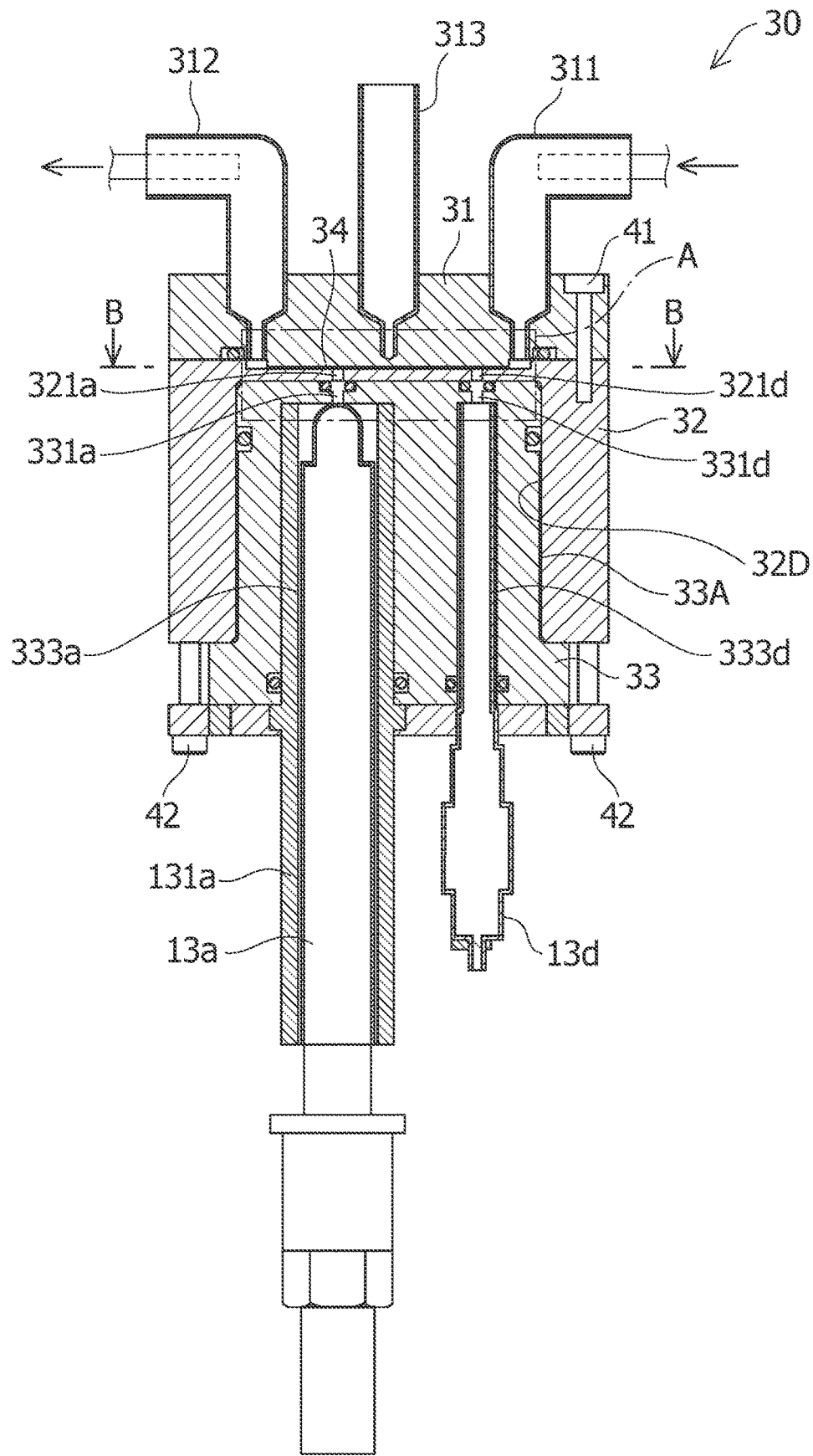
FIG. 3 is a sectional view of a sensor block describing the positional relationship between a sensor head part and a sensor head receiving part at measurement in which sensors and condensed water stored in a gap simulation part are in contact with each other in the corrosion monitoring device according to the embodiment of the present invention.
Figure 4:
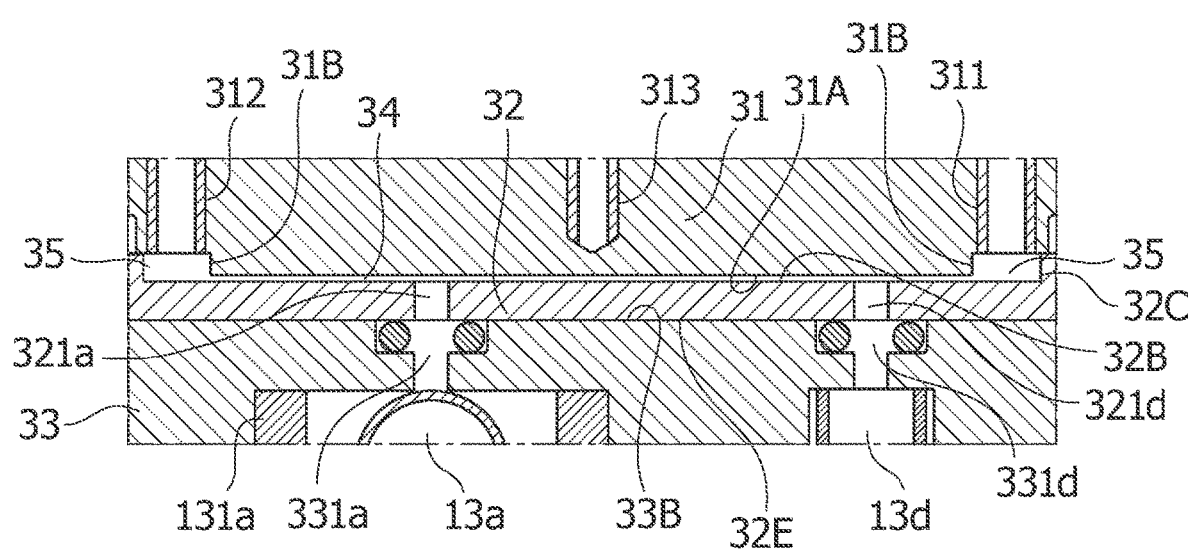
FIG. 4 is an enlarged sectional view of a part A indicated by a dotted-dashed line in FIG. 3.
Figure 5:
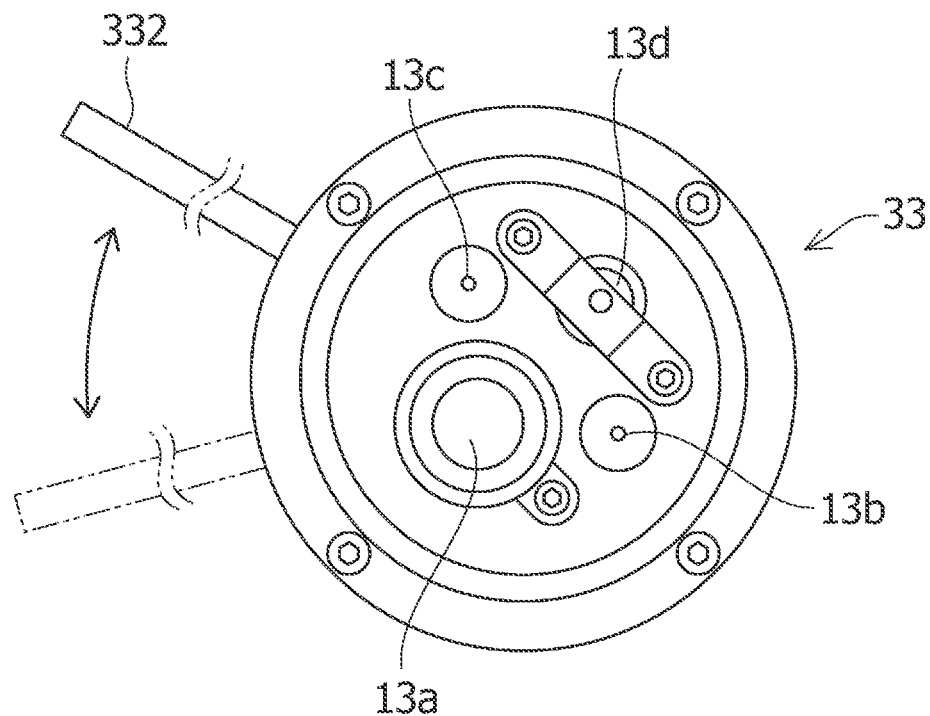
FIG. 5 is a bottom view of the sensor block of FIG. 3 describing a relative turn between the sensor head part and the sensor head receiving part.
Figure 6:
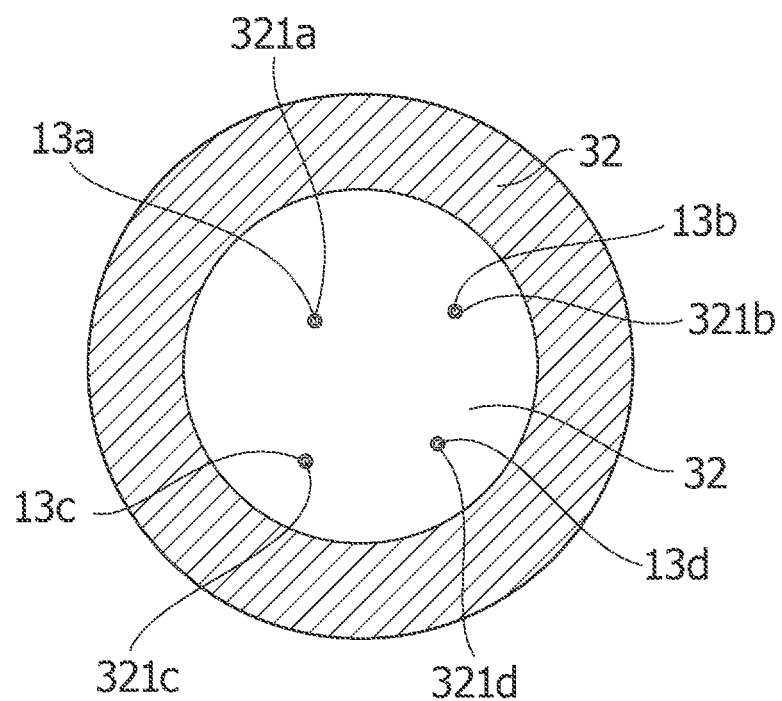
FIG. 6 is a sectional view taken along line B-B in FIG. 3 describing the positional relationship between the sensor head receiving part in contact with the gap simulation part and sensors.
Figure 7:
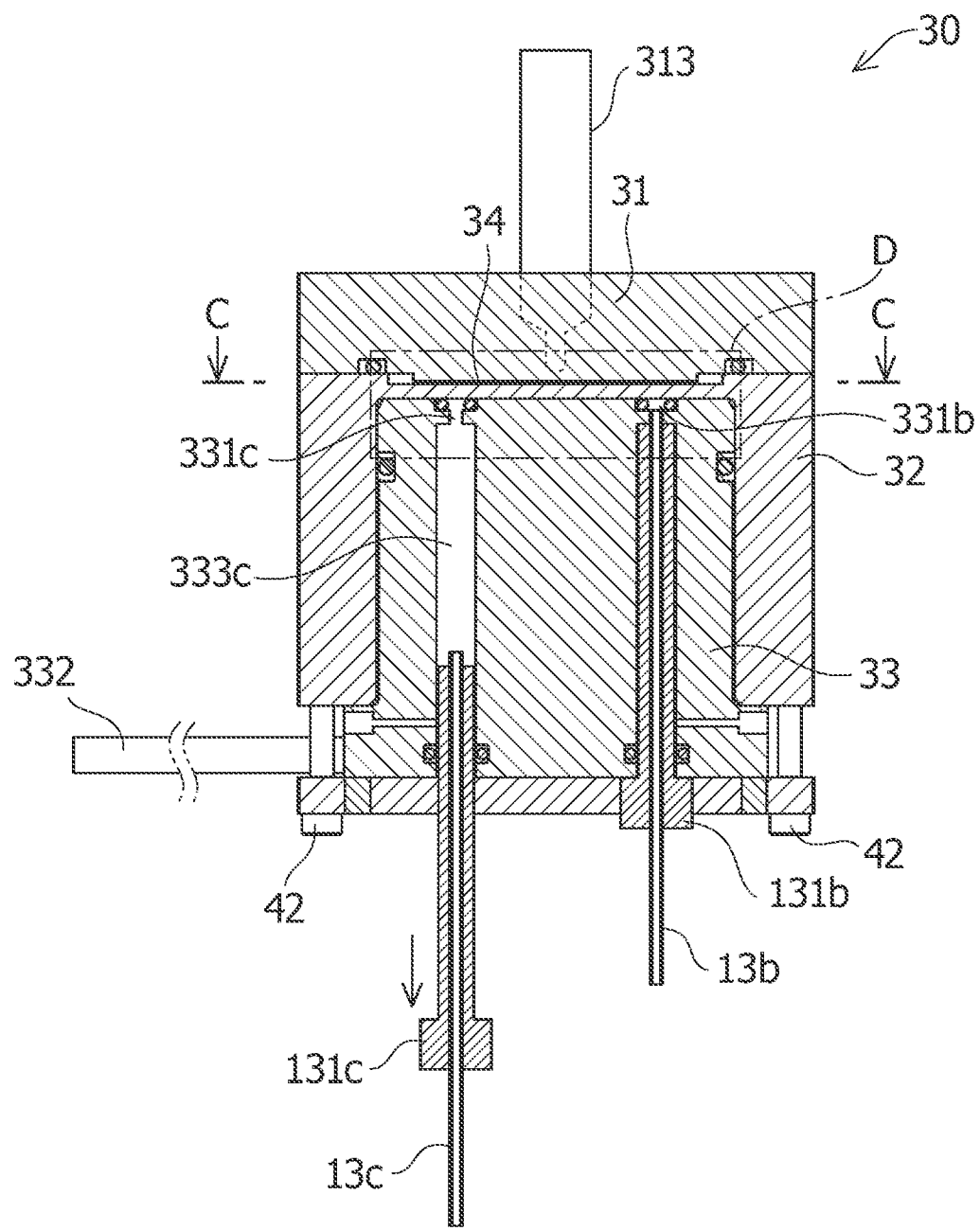
FIG. 7 is a sectional view of the sensor block describing the positional relationship between the sensor head part and the sensor head receiving part at measurement standby in which contact between the sensors and condensed water stored in the gap simulation part is blocked in the corrosion monitoring device according to the embodiment of the present invention.
Figure 8:
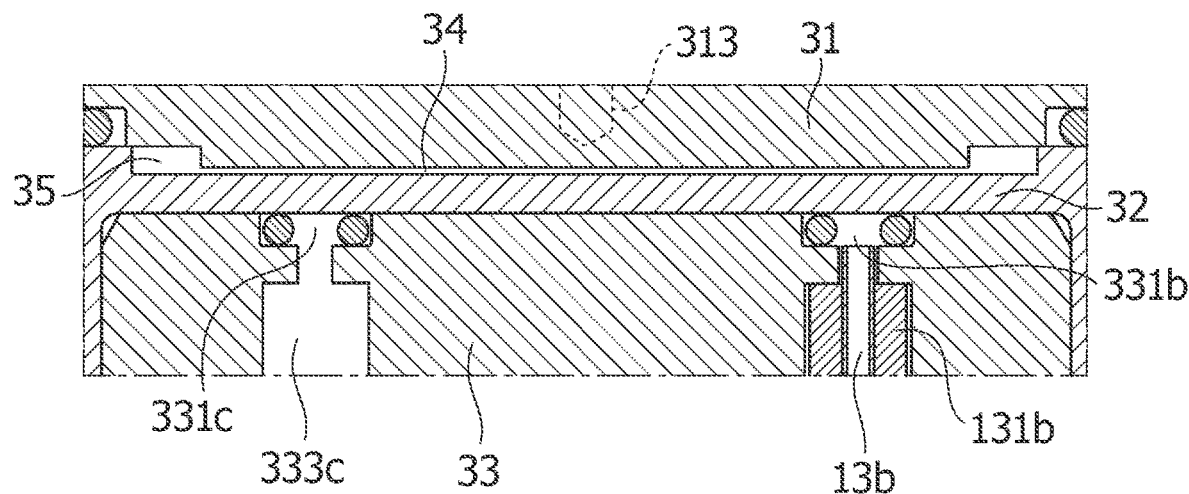
FIG. 8 is an enlarged view of a part D indicated by dotted-dashed line in FIG. 7.
Figure 9:
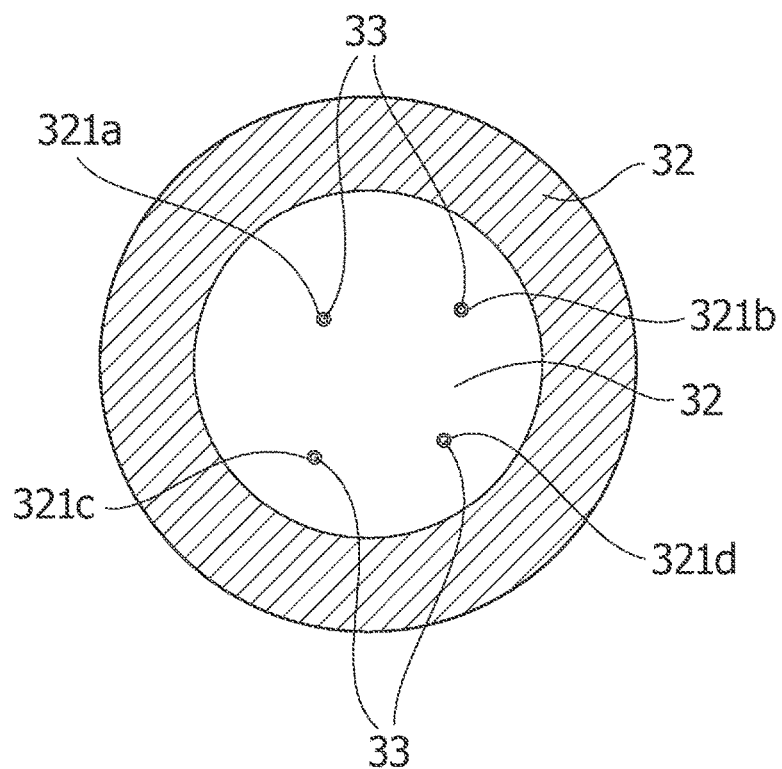
FIG. 9 is a sectional view taken along line C-C in FIG. 7 describing the positional relationship between the sensor head receiving part in contact with the gap simulation part and the sensor head.

Hereinbelow, an example of the detailed configuration of the sensor block 30 will be described with reference to FIGS. 3 to 9. FIG. 3 is a sectional view of the sensor block 30 having a substantially cylindrical shape taken along a line that passes through the diameter of the circle and is parallel to the axis of the cylinder. FIG. 4 is an enlarged sectional view of a part A of FIG. 3. FIG. 5 is a bottom view of the sensor block 30 of FIG. 3. FIG. 6 is a sectional view taken along line B-B in FIG. 3. FIG. 7 is a sectional view of the sensor block 30 illustrated in FIG. 3 in a state in which a sensor head part is turned. FIG. 8 is an enlarged sectional view of a part D of FIG. 7. FIG. 9 is a sectional view taken along line C-C in FIG. 7.

As illustrated in FIG. 3, the sensor block 30 includes a lid body 31, a sensor head receiving part 32, and a sensor head part 33 which are integrated together. The material of each member of the sensor block 30 is preferably a material that exhibits corrosion equivalent to that of the blade material of the turbine to eliminate changes in the corrosive environment caused by the presence of dissimilar metals. The lid body 31 and the sensor head receiving part 32 constitute the condensed water storage part 12. The sensor head receiving part 32 and the sensor head part 33 together function as the switching part of the corrosion factor sensor part 13.

Each member of the sensor block 30 and the function thereof will be described. The lid body 31 is a member having a substantially cylindrical shape and provided with a condensed water feed part 311 and a condensed water discharge part 312. Referring to FIGS. 3 and 4, one end face 31A of the lid body 31 is stepped so that the central part projects relative to the outer edge part. The condensed water feed part 311 and the condensed water discharge part 312 each have an opening on the outer edge part of the stepped end face. The condensed water feed part 311 is connected to the steam extraction pipe 11. The condensed water discharge part 312 is connected either to a drain path for condensate of the geothermal steam turbine device 20 or into the atmosphere so that the condensed water can be discharged.

The sensor head receiving part 32 is a member having a bottomed cylindrical shape and has a plurality of through holes 321*a, d* on the bottom thereof. Referring to FIGS. 3 and 4, an outer bottom face 32B of the sensor head receiving part 32 is stepped so that the central part is recessed relative to the outer edge part.

Referring to FIGS. 3 and 4, the lid body 31 and the sensor head receiving part are fixed to each other with a screw 41 with the projecting part of the lid body 31 and the recessed part of the sensor head receiving part 32 fitted to each other. A spacer (not illustrated) is provided between the projecting end face 31A of the lid body 31 and the recessed bottom face 32B of the sensor head receiving part 32 to form a gap simulation part 34. The gap simulation part 34 is a cylindrical space surrounded by the end face 31A of the lid body 31, the bottom face 32B of the sensor head receiving part, and an inner wall face 32C of the outer edge part of the bottom face of the sensor head receiving part 32. Furthermore, an annular channel 35 surrounded by a wall face 31B of the projecting part of the lid body 31, the inner wall face 32C of the outer edge part of the bottom face of the sensor head receiving part 32, and the outer edge part of the lid body 31 is formed. The annular channel 35 surrounds the outer periphery of the gap simulation part 34 and communicates with the gap simulation part 34 in the entire circumference thereof.

The gap simulation part 34 and the annular channel 35 simulate a gap length in a blade leg part of the turbine. The height and the width of the annular channel 35 are each set to a length with which the gap length in the blade leg part of the turbine can be simulated. In particular, the height of the gap simulation part 34, that is, the distance between the end face 31A of the lid body 31 and the bottom face 32B of the sensor head receiving part is adjustable by changing the thickness of the spacer and may be approximately 0.05 to 0.3 mm. The condensed water is fed to the gap simulation part 34 from the condensed water feed part 311 provided on the lid body 31 and flows to the condensed water discharge part 312 through the outer periphery of the gap simulation part

34. Referring to FIG. 4, the condensed water fed from the condensed water feed part 311 can be divided into the front side and the back side of the sheet and can flow toward the condensed water discharge part 312 through the annular channel 35. The condensed water partially flows into the gap simulation part 34 while flowing through the annular channel 35, and corrosive components such as chloride ions are concentrated therein. This concentration of chloride ions occurs due to cations of iron or the like attracting anions, the cations being produced by corrosion caused by the action of an oxygen concentration cell in the gap simulation part 34 in which the supply of oxygen is relatively poor.

The lid body 31 is also provided with a thermocouple 313. The thermocouple 313 functions as a temperature sensor and monitors the temperature of the condensed water in direct contact or indirect contact with the condensed water. Note that the lid body 31 may be provided with another sensor that measures the temperature of the condensed water instead of the thermocouple. Alternatively, a sensor that measures the temperature of the condensed water may be provided in a place other than the lid body 31.

The sensor head part 33 is rotatably fitted to the inside of the cylinder of the sensor head receiving part 32 having a cylindrical shape with a bottom. Referring to FIGS. 3 and 4, an outer side face 33A and one end face 33B of the sensor head 33 are in contact with an inner side face 32D and an inner bottom face 32E of the cylinder constituting the sensor head receiving part 32.

The sensor head 33 is a cylindrical member and holds, inside thereof, the plurality of sensors 13a, b, c, d. The sensors 13a, b, c, d are each removably inserted into a tubular part, the tubular part penetrating the cylinder parallel to the axis of the cylinder. The tubular part has a two-stage diameter. One end of the tubular part having contact with the sensor head receiving part 32 has a small diameter and constitutes a condensed water inflow part 331a, d. The condensed water inflow parts 331a, d are each configured as a space into which the condensed water in the gap simulation part 34 can flow at measurement. The condensed water flowing into the space comes into contact with an electrode provided on the tip of the sensor, and sensing is thus performed. The diameter of the tube constituting the condensed water inflow part 331a, d may be, for example, approximately 1.5 to 3 mm. A part having a large diameter functions as a sensor support part 333a, d. The diameter of the sensor support part 333a, d may have a size corresponding to the diameter of the sensor 13a, d or a sensor holder 131a that is made of resin and holds the sensor.

Referring to FIG. 3, the pH sensor 13a and the reference electrode 13d are each inserted into the sensor head 33 parallel to the axis of the sensor head 33. An electrode provided on the tip of the pH sensor 13a is located near the sensor head receiving part 32 and contactable with the condensed water flowing into the condensed water inflow part 331a in the illustrated state. The base of the pH sensor 13a projects from the sensor head 33 and is electrically connected to the control device (not illustrated). Similarly, an electrode provided on the tip of the reference electrode 13d is also located near the sensor head receiving part 32 and contactable with the condensed water flowing into the condensed water inflow part 331d. The base of the reference electrode 13d projects from the sensor head 33 and is electrically connected to the control device (not illustrated).

FIG. 5 is a bottom view of the sensor block 30 of FIG. 3. Referring to FIG. 5, the sensor head 33 holds the electrolytic corrosion potential sensor 13b and the chloride ion sensor 13c in addition to the pH sensor 13a and the reference electrode 13d illustrated in FIGS. 3 and 4.

Next, FIG. 6 is a sectional view taken along line B-B in FIG. 3. The bottom of the sensor head receiving part 32, the bottom facing the gap simulation part 34, has through holes 321a, b, c, d. The through holes 321a, b, c, d correspond to the sensors 13a, b, c, d to be inserted into the sensor head 33 in number and position. At the rotated position of the sensor head 33 illustrated in FIGS. 3 and 4, the through holes 321a, b, c, d of the sensor head receiving part 32 communicate with the condensed water inflow parts 331a, b, c, d of the sensor head 33, respectively. Thus, the condensed water in the gap simulation part 34 can flow into the condensed water inflow parts 331a, b, c, d through the through holes 321a, b, c, d and come into contact with the sensors 13a, b, c, d. The diameter of the through holes 321a, b, c, d may be similar to the diameter of the condensed water inflow parts 331a, b, c, and may be, for example, approximately 1.5 to 3 mm. The number and arrangement of through holes provided on the sensor head receiving part 32 may vary depending on the number and arrangement of sensors to be inserted into the sensor head 33, and thus, are not limited to those in the illustrated embodiment. However, the positions of the through holes 321a, b, c, d are determined so that the through holes 321a, b, c, d are covered by the body of the sensor head 33 when the sensor head 33 is turned.

The pH sensor 13a, the electrolytic corrosion potential sensor 13b, the chloride ion sensor 13c, and the reference electrode 13d are electrically connected to the control unit (not illustrated in FIGS. 2 to 9). The control unit may be, for example, a computer that can perform a predetermined operation on a measured value read by each sensor 13 to create a result of monitoring. Note that the sensors illustrated in the present embodiment are examples, and the present invention is not limited to a mode provided with a specific sensor. For example, only the electrolytic corrosion potential sensor may be provided. Alternatively, a conductivity sensor that detects the conductivity of condensed water may be provided to measure the conductivity of condensed water in addition to some or all of the illustrated sensors. Furthermore, a carbon dioxide sensor and/or a hydrogen sulfide sensor may be additionally provided to measure the concentration of carbon dioxide or hydrogen sulfide in condensed water. The selection of sensors enables a desired corrosion factor analysis and also enables improvement in the accuracy of the corrosion factor analysis.

Again referring to FIG. 5, the sensor head 33 is provided with a lever 332 and is rotatable relative to the sensor head receiving part 32 using the lever. In FIG. 5, the position of the lever 332 turned from a state illustrated in FIGS. 3 and 4 indicated by a solid line is indicated by a virtual line. The sensor head 33 may be manually turned using the lever or may be automatically turned using, for example, a motor. When a driving mechanism that automatically rotates is provided, the motor may be controlled by, for example, the control unit 15 illustrated in FIG. 1.

Next, FIG. 7 is a sectional view of the sensor block 30 in a measurement standby state in which the sensor head 33 is turned relative to the sensor head receiving part 32. For illustration, FIG. 7 shows a section different from that in FIG. 3. Since the lid body 31 and the sensor head receiving part 32 are fixed, rotating the sensor head 33 does not change the relative positional relationship between the lid body 31 and the sensor head receiving part 32. The arrangement of each member of the lid body 31 and the sensor head receiving part 32 is as described above with reference to FIG. 3.

FIG. 7 is a sectional view of the sensor block 30 in the measurement standby state taken along the central axis of the electrolytic corrosion potential sensor 13b and the central axis of the chloride ion sensor 13c. Referring to FIG. 7, the electrolytic corrosion potential sensor 13b and the chloride ion sensor 13c can be visually recognized in the sectional view. Referring to FIGS. 7 and 8, an opening of the condensed water inflow part 331b on the tip of the electrolytic corrosion potential sensor 13b, the opening facing the sensor head receiving part 32, is closed by the sensor head receiving part 32. Thus, the condensed water inflow part 331b does not communicate with the through hole. This is because the position of the through hole of the sensor head 33 is displaced from the position of the condensed water inflow part 331b by turning the sensor head from the state illustrated in FIG. 3. Similarly, an opening of the condensed water inflow part 331c on the tip of the chloride ion sensor 13c, the opening facing the sensor head receiving part 32, is closed by the sensor head receiving part 32. Thus, the condensed water inflow part 331c does not communicate with the through hole. Referring to FIG. 9, opening of all of the through holes 321a, b, c, d of the sensor head receiving part 32, the openings facing the sensor head, are closed by the body of the sensor head 33. Thus, the through holes 321a, b, c, d do not communicate with the condensed water inflow parts (not illustrated). Thus, the condensed water flowing into the through holes 321a, b, c, d of the sensor head receiving part 32 from the gap simulation part 34 cannot flow into the condensed water inflow parts (not illustrated in FIG. 9) from the through holes 321a, b, c, d, and thus cannot come into contact with the electrodes serving as sensor sensing parts.

In the state illustrated in FIG. 7, the chloride ion sensor 13c is removable from the sensor head 33 together with a sensor holder 131c. The moving direction of the sensor 13c when the sensor 13c is removed is indicated by an arrow. The electrode of the removed chloride ion sensor 13c, the electrode having made contact with the condensed water, can be cleaned by a cleaner (not illustrated). The cleaner may be a device capable of feeding clean water to the electrode on the tip of the sensor and washing the condensed water away. Although not illustrated, similarly, the pH sensor 13a, the electrolytic corrosion potential sensor 13b, and the reference electrode 13d can also be removed and cleaned.

The sensor block 30 of the present embodiment having the configuration described above is switchable between a state in which the sensors 13a, b, c, d are in contact with the condensed water and a state in which the sensors are insulated from the condensed water. Accordingly, the properties of the condensed water can be intermittently monitored. Even when steam containing a large amount of corrosive components, such as sulfur, is monitored, the sensors are less likely to be damaged, and the monitoring can be performed with high reliability for a long period of time.

As another mode of the present embodiment, a member having a shutter mechanism may be used at the position of the through hole of the sensor head receiving part instead of the combination of the sensor head part and the sensor head receiving part which are relatively rotatable. The shutter mechanism enables switching between the contact state and the non-contact state between the condensed water present in the gap simulation part 34 and the sensor. Thus, the same action as in the illustrated embodiment can be obtained.

Next, the operation of the corrosion monitoring device according to the present embodiment will be described. In the low-pressure blade row illustrated in FIG. 2, when the operation of the steam turbine is started from the stopped state and the internal pressure of the steam turbine thus increases, steam inside the turbine casing 21 is extracted through the steam extraction pipe 11 and carried out of the casing 21. Cooling water from the chiller of the steam cooler 14 is fed to the cooling water feed path through a cooling water pipe and returns to the chiller from the cooling water discharge path through the cooling water pipe, which forms a cooling water circulation path. Accordingly, the high-temperature steam flowing through the steam extraction pipe 11 is cooled, and condensed water is produced while the steam is transferred to the sensor block 30. Then, the condensed water is fed to the annular channel 35 and the gap simulation part 34 through the condensed water feed part 311. The start and stop of the feeding of condensed water to the annular channel 35 and the gap simulation part 34 and the adjustment of the amount of condensed water to be fed can be appropriately performed upstream of the condensed water feed part 311 using, for example, a pump (not illustrated).

At measurement, in the sensor block 30, the through holes 321a, b, c, d of the sensor head receiving part 32 are previously aligned with the condensed water inflow parts 331a, b, c, d of the sensor head 33, respectively, as illustrated in FIGS. 3, 4, and 6. This enables the condensed water fed to the gap simulation part 34 to pass through the through holes 321a, b, c, d of the sensor head receiving part 32 and flow into the condensed water inflow parts 331a, b, c, d so as to come into contact with the sensing parts of the respective sensors 13a, b, c, d. Then, the potential of the condensed water is measured at the electrode of each sensor, and a result of the measurement is sent to the control device 15. A blade material potential can be measured from a potential difference between the reference electrode 13d and the sensor electrode of the electrolytic corrosion potential sensor 13b. Furthermore, pH can be measured from a potential difference between the reference electrode 13d and the sensor electrode of the pH sensor 13a. Furthermore, a chloride ion concentration can be measured from a potential difference between the reference electrode 13d and the sensor electrode of the chloride ion sensor 13c. The control device 15 can optionally perform an analysis of the corrosion condition on the basis of the blade material potential, the pH, and the chloride ion concentration.

When no measurement is performed (standby), the openings of the condensed water inflow parts 331a, b, c, d of the sensor head 33 are blocked by the bottom of the sensor head receiving part 32 as illustrated in FIGS. 7, 8, and 9 by turning the sensor head 33. Accordingly, the condensed water present in the gap simulation part 34 cannot flow into the condensed water inflow parts 331a, b, c, d. When no measurement is performed, it is preferred that each of the sensors 13a, b, c, d be removed from the sensor head 33 and the electrode on the tip of each of the sensors 13a, b, c, d be washed with clean water. By repeatedly performing these operations, it is possible to properly operate the sensors 13a, b, c, d for a long period of time and perform accurate corrosion monitoring even in an environment in which steam containing a large amount of corrosive components such as geothermal steam is measured. Also, when no measurement is performed, the feeding of condensed water from the condensed water feed part 311 can be stopped.

The switching between measurement and non-measurement can be performed manually or using a driving mechanism such as a motor. The measurement of a corrosion factor can be intermittently performed. For example, when the turn of the sensor head 33 is driven by the motor, the measurement time and the non-measurement time can be set to 10 seconds and 50 seconds, respectively. Alternatively, the measurement can be performed 1 to 24 times a day for approximately 10 to 20 seconds per measurement.

Next, a plurality of corrosion factors (the blade material potential, the pH, and the chloride ion concentration) in the analysis of the corrosion condition performed in the control device 15 will be described. The chloride ion concentration is a main corrosion factor in the steam turbine. An increase in the chloride ion concentration forms chloride, produces hydrogen ions due to hydrolysis of the chloride, and increases the hydrogen ion concentration. That is, when chloride ions produce corrosion pits, the chloride ion concentration is likely to increase inside the corrosion pits. The pH represents the hydrogen ion concentration in a solution. An increase in the hydrogen ion concentration (decrease in the pH) accelerates ionization (oxidation reaction) of the turbine members. The blade material potential represents the corrosivity of each member to the solution in contact with the member. Corrosion is more likely to occur as the potential increases. The blade material potential increases as the hydrogen ion concentration increases.

A corrosion factor particular to geothermal steam turbines will be described. Steam of geothermal steam turbines contains carbon dioxide and hydrogen sulfide. The carbon dioxide becomes carbonic acid and produces hydrogen ions in condensed water. The hydrogen sulfide can form iron sulfide and play a role of protecting the surface of the turbine member. However, the hydrogen sulfide may be decomposed by chloride ions, which causes pitting corrosion.

As described above, the blade material potential is influenced by the chloride ion concentration and the pH and serves as a parameter of the corrosivity condition of the member. An important point in preventive maintenance is to know causes of fluctuations in the blade material potential. Thus, also measuring basic factors such as the pH and the chloride ion concentration makes it possible to more accurately understand and estimate the corrosion condition and further improve the accuracy in cautions for the steam environment, which enables appropriate maintenance and management measures. Examples of the maintenance and management measures include setting of the replacement cycle of moving blades and control of injection of a corrosion inhibitor.

INDUSTRIAL APPLICABILITY

The corrosive environment monitoring device according to the present invention can be suitably used in, for example, geothermal power generation facilities and thermal power generation facilities.

REFERENCE SYMBOL LIST

10 Corrosion monitoring device
11 Steam extraction part (steam extraction pipe)
12 Condensed water storage part
13 Corrosion factor sensor part
13a pH sensor
13b Electrolytic corrosion potential sensor
13c Chloride ion sensor
13d Reference electrode
14 Steam cooler
15 Control unit
20 Geothermal steam turbine device
21 Casing
22 Steam turbine
30 Sensor block
31 Lid body
32 Sensor head receiving part
33 Sensor head part
34 Gap simulation part
35 Annular channel
311 Condensed water feed part
312 Condensed water discharge part
313 Thermocouple
321a, b, c, d Through hole
331a, b, c, d Condensed water inflow part

What is claimed is:

1. A corrosive environment monitoring device comprising:
a steam extraction part that extracts steam from inside of a casing of a steam turbine to outside thereof;
a condensed water storage part that stores therein condensed water produced by condensation of steam passing through the steam extraction part; and
a corrosion factor sensor part that detects properties of the condensed water, wherein
the condensed water storage part includes a gap simulation part that simulates a gap inside the turbine and has a predetermined gap capable of storing the condensed water therein, and an annular channel formed on an outer periphery side of the gap simulation part, and
the corrosion factor sensor part includes one or more sensors capable of measuring the properties of the condensed water, and a switching part configured to be capable of switching between contact and non-contact between the one or more sensors and the condensed water stored in the gap simulation part.

2. The corrosive environment monitoring device according to claim 1, wherein
the switching part includes a sensor head part that houses the one or more sensors therein, and a sensor head receiving part provided between the sensor head part and the gap simulation part,
the sensor head receiving part has a through hole provided corresponding to the one or more sensors,
the sensor head part is turned relative to the sensor head receiving part to perform switching between a state in which the one or more sensors and the condensed water stored in the gap simulation part are contactable through the through hole and a state in which contact between the one or more sensors and the condensed water stored in the gap simulation part is blocked by the sensor head receiving part interposed between the one or more sensors and the gap simulation part.

3. The corrosive environment monitoring device according to claim 2, wherein the one or more sensors are removably supported by the sensor head part.

4. The corrosive environment monitoring device according to claim 3, further comprising a cleaner capable of cleaning the one or more sensors.

5. The corrosive environment monitoring device according to claim 1, wherein the one or more sensors include any one or more of an electrolytic corrosion potential sensor, a pH sensor, or a chloride ion sensor.

6. The corrosive environment monitoring device according to claim 1, wherein the steam is geothermal steam.

7. A power generation facility comprising a steam turbine device including a turbine inside a casing; and the corrosive environment monitoring device according to claim 1.

* * * * *